(12) United States Patent
Jacobson

(10) Patent No.: US 8,823,801 B2
(45) Date of Patent: Sep. 2, 2014

(54) DIGITAL X-RAY CAPTURE DEVICE

(75) Inventor: James Scott Jacobson, Spokane Valley, WA (US)

(73) Assignee: James Scott Jacobson, Spokane Valley, WA (US)

( * ) Notice: Subject to any disclaimer, the term of this patent is extended or adjusted under 35 U.S.C. 154(b) by 506 days.

(21) Appl. No.: 13/317,351

(22) Filed: Oct. 17, 2011

(65) Prior Publication Data

US 2013/0093900 A1  Apr. 18, 2013

(51) Int. Cl.
   *H04N 5/30* (2006.01)
   *H04N 5/335* (2011.01)
(52) U.S. Cl.
   USPC .................................... 348/162; 348/E5.086
(58) Field of Classification Search
   CPC .......... H04N 5/32; H04N 5/30; G01T 1/1645; G01T 1/2992; G01S 7/10
   See application file for complete search history.

(56) References Cited

U.S. PATENT DOCUMENTS

2011/0001829 A1* 1/2011 Lai ................................ 348/162

* cited by examiner

*Primary Examiner* — Dave Czekaj
*Assistant Examiner* — Nam Pham

(57) ABSTRACT

A digital X-ray capture device that uses an image array camera to capture a digital image of a standard X-ray film. The X ray-film is placed on a tray within a housing. An array of LED lights located under the tray illuminate the film. In the preferred embodiment the illuminated image of the X-ray bounces off a forty-five degree angle mirror and enters the image array camera. The digital image can then be downloaded to a standard computer. Custom software allows the user to manipulate the image as needed. The entire capture process takes only two seconds. A patients information can be added to the boarder of the captured image. The captured image can be sent via email to any other computer.

8 Claims, 16 Drawing Sheets

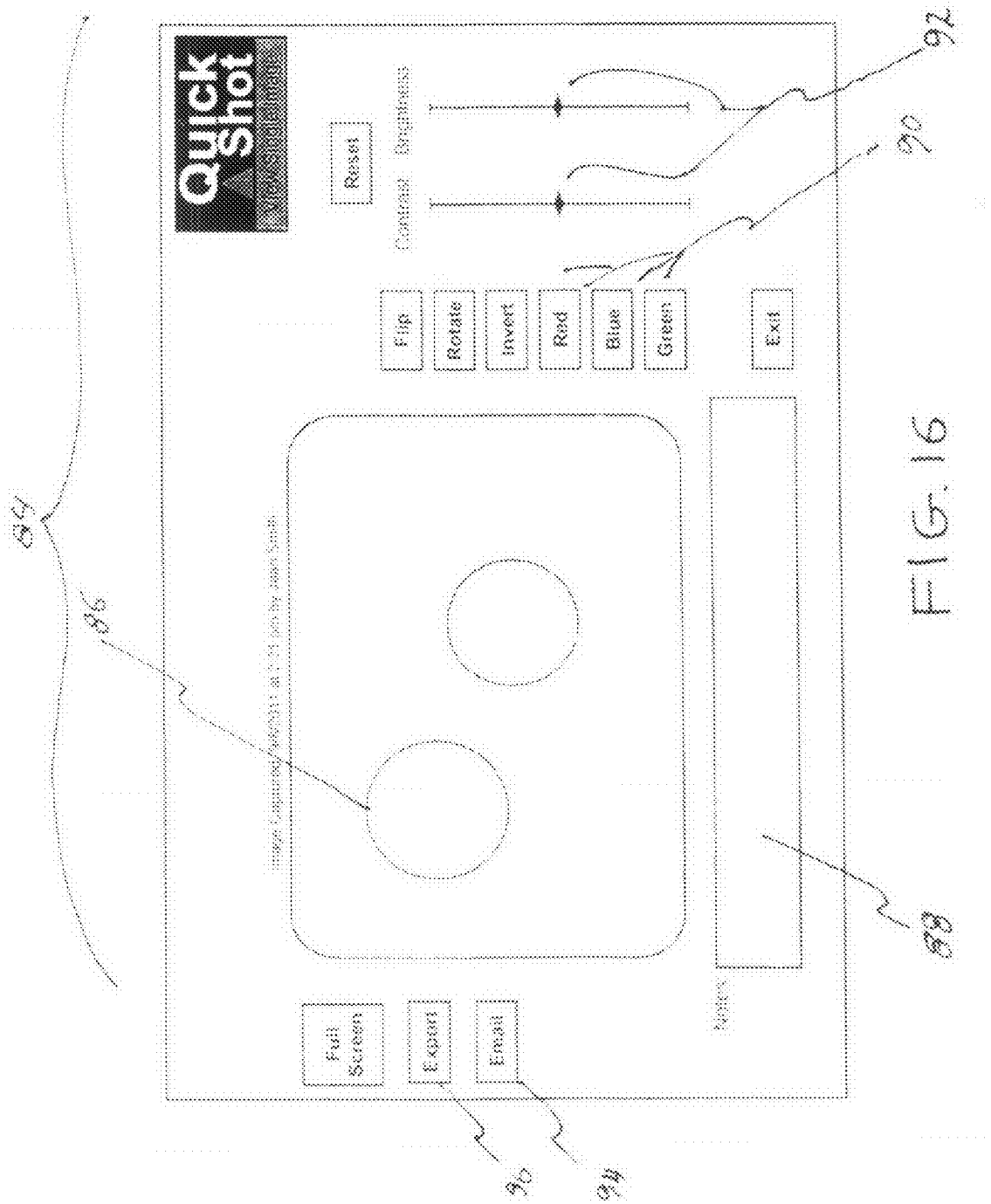

DIGITAL X-RAY CAPTURE DEVICE

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of digital visual recording devices and more specifically to a digital X-ray capture device.

In the medical field, doctors frequently take X-ray images of a portion of a patient's body for diagnostic purposes. These X-ray images are done on high resolution black and white film. The images are usually stored in a filing area along with the rest of the patient's medical history. The storage of these X-rays takes considerable room in a medical office. Additionally, the film may become lost or damaged over time. Additionally, presentation of the film to the patient is often difficult. Finally, it is time consuming to send X-ray films to other medical specialists who are not in close proximity to the film storage facility.

Recently, with advances in digital radiography, a number of manufacturers are offering digital X-ray sensors for sale to medical practitioners such as dentists and doctors. These devices capture X-ray exposure directly, instead of a photographic film process, and then display it on a computer screen. Another digital method involves the digital scanning of an X-ray film that has been taken by conventional means, so that a digital copy of the X-ray film can be stored and manipulated in a standard computer.

However, there are a number of deficiencies in each of these two technologies. First, the digital method of taking an X-ray type picture eliminates the safety feature of having an original "hard" copy of the X-ray. If there is a crash of computer or hard drive that is storing digital images or there is data corruption, there is no original X-ray film to go back to. Second, if a medical practitioner wishes to see an enlarged image of the digital X-ray, the image can become pixilated, meaning that rather than having a smooth clear picture, the image is visibly broken up into its component pixel dots and therefore not able to be viewed. In the second option of digitally scanning an existing X-ray film, the scanning process is time consuming. There is a warm up time for the machine, and then the scanning process itself has preview and high-resolution scan step that can take several minutes. Additionally, the moving parts in a scanner, such as stepper motors and moving platens are susceptible to breakage and also contribute to the high cost of the scanning system.

BRIEF SUMMARY OF THE INVENTION

The primary object of the invention is to provide a device and method for digitally recording an image of an X-ray captured on photographic film so that the digital image of the X-ray can be stored and accessed in a standard computer.

Another object of the invention is to use a camera as the input device to digitize film.

Another object of the invention is to provide a device and method for digitally recording an image of an X-ray where the device is relatively compact and can be quickly and easily used by a dentist for capturing and storing dental X-rays.

Another object of the invention is to provide a device and method for digitally recording an image of an X-ray where each image includes identification information of the patient.

A further object of the invention is to provide a device and method for digitally recording an image of an X-ray where back-light brightness and contrast of each image can be adjusted for maximum clarity when the image is actually captured rather than electronically altered after capture.

Yet another object of the invention is to provide a device and method for digitally recording an image of an X-ray where custom film trays allow the quick loading standard size film sheets.

Still yet another object of the invention is to provide a device and method for digitally recording an image of an X-ray that can be enlarged without pixelation.

Another object of the invention is to provide a device and method for digitally recording an image of an X-ray that can subsequently be emailed to another computer anywhere in the world.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a digital X-ray capture device comprising: a hollow housing, a reflective mirror member, a plurality of LED's, a film tray, an image array camera, an LED dimming control, a timing circuit, a micro-processor, a power supply, an on-off switch, a plurality of function indicating lights, custom computer software, said hollow housing being essentially rectangular in shape except for the front top and sides of said housing which are mitered at a forty-five degree angle, said hollow housing including a front slot and inside ledges capable of removably inserting said film tray, said film tray being made of rigid transparent material, said LED's mounted in a uniform array to the inside bottom of said hollow housing and facing upward to evenly illuminate a sheet or sheets of film that are placed in said film tray, said reflective mirror member mounted to the underside of said forty-five degree angle portion of said housing, said image array camera fixedly mounted to the inside rear surface of said hollow housing, said image array camera capable of receiving and capturing an image of a standard photographic X-ray film that is placed in said film tray and is illuminated by said dimmable LED array and said image is bounced off of said reflective mirror member and into said camera, said microprocessor capable of receiving said image and sending it, via USB cable, to an external standard computer device that is loaded with said custom computer software suitable for manipulating said image, all said internal electric components powered by said power supply, said power supply controlled by said on-off switch, and said image receiving and capturing functions signaled as they occur by said function indicating lights.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 16 is a screen image of a Single Image and manipulation keys.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
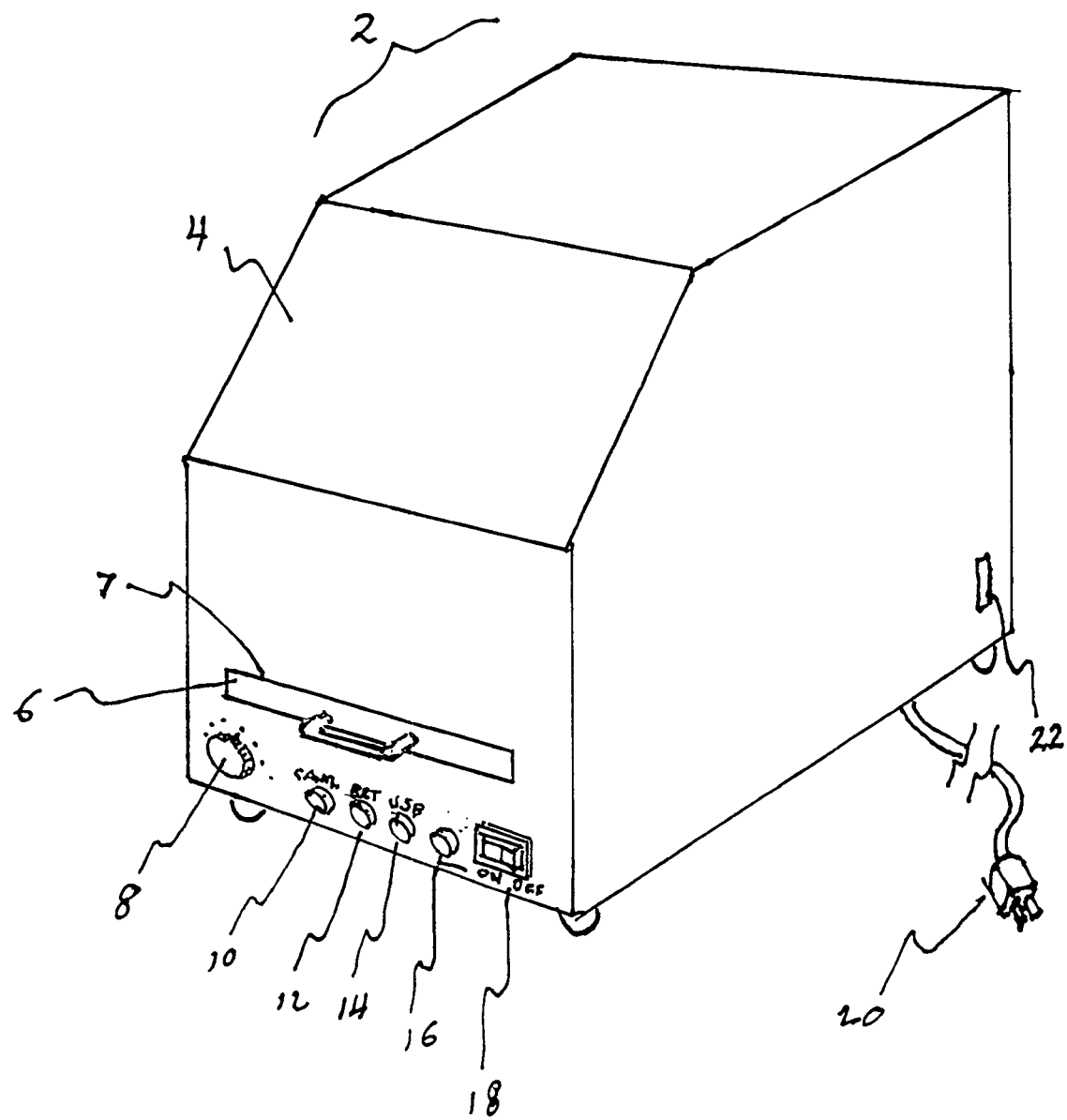
FIG. 1 is a perspective view of the invention.

Referring to FIG. 1 we see a perspective view of the digital X-ray film capturing device of the present invention. I rigid hollow housing 2 is essentially rectangular in shape and has a forty-five degree mitered portion 4 at the front top area. The front of the housing includes a cutout portion 7 for removably receiving a film tray 6. A USB port 22 allows a cable to connect the digital information generated by a digital image array camera 32 within the housing to a standard computer. The entire device of the present invention is powered by standard 120 VAC electricity and connected by standard plug 20, however, other voltages may be accommodated by the addition of a voltage changing transformer. Control features for the invention include an on-off switch 18, an on-off indicator light 16, a USB connect indicator light 14, a "camera on" indicator light 10 and a brightness indicator light 12 which becomes brighter or dimmer as the user adjusts the dimmer control 8 which in turn controls the brightness of an LED array 26 located inside the housing 2 as shown in FIG. 2.

Figure 2:
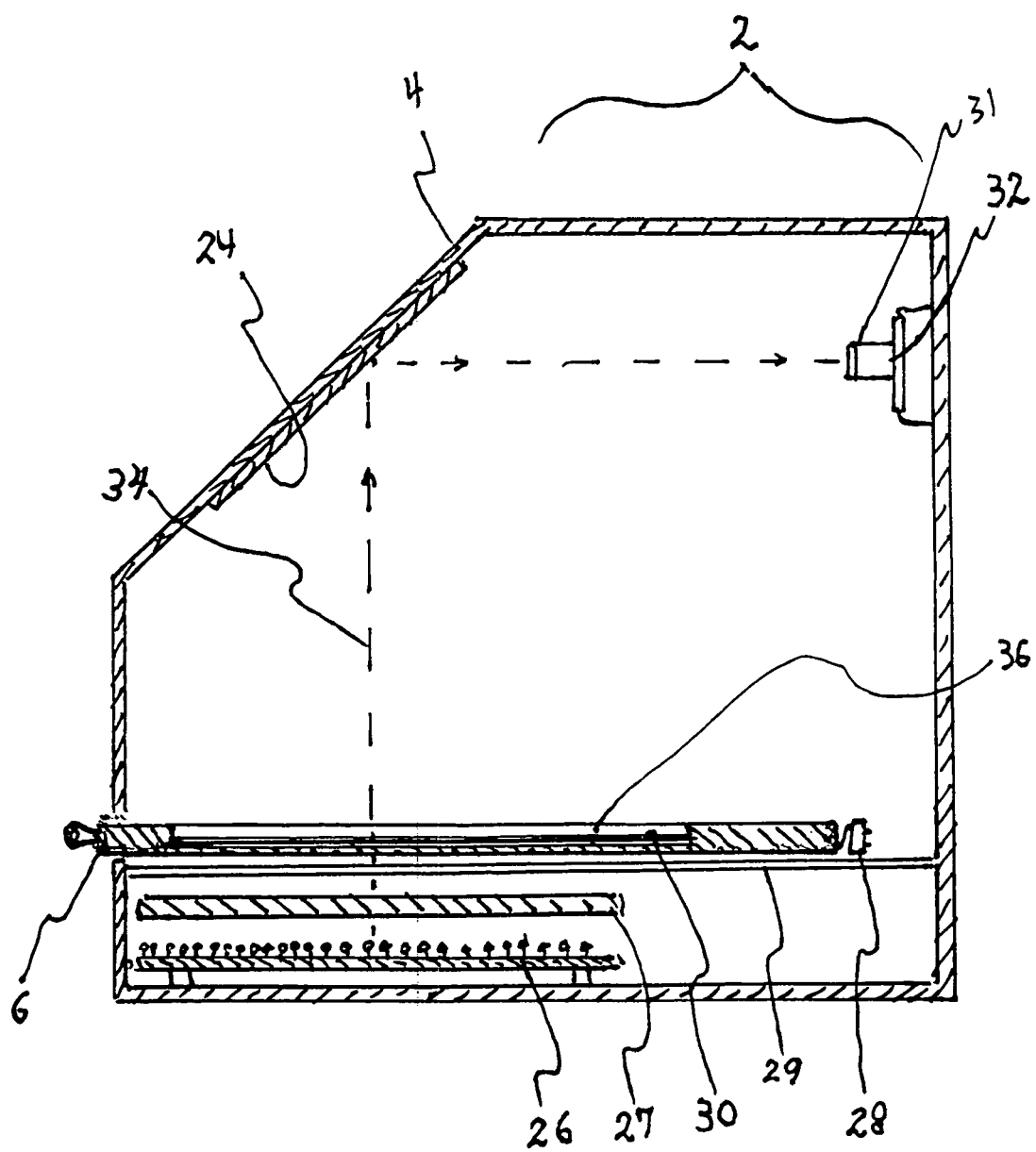
FIG. 2 is a side section view of the invention.

Referring to FIG. 2 we see a side section view that bisects the housing 2 of the invention. The film tray 6 can be seen in place and sitting on support rail 29. The base of the tray is made of transparent material. Light from the LED array 26 passes through a translucent sheet 27 creating a uniform white light to enter and pass through the film sheet 30. The preferred translucent material is one quarter inch thick translucent acrylic #2447 manufactured by Laird Plastics. In an alternate embodiment the film tray 6 can be made from translucent plastic rather than transparent material, thereby eliminating the need for a separate sheet of translucent plastic 27 to create a uniform white light. The film 30 is sitting in a depressed area 36 within the tray 6. The film is thereby aligned with the image array capture camera 32. Reflective mirror 24 is mounted to the underside of sloping housing portion 4 and directs light from an LED array 26 which passes through film sheet 30 and into a lens 31 which focus the light onto the image array capture camera 32 as shown by dashed line 34. Of course, an alternate embodiment of the invention can exclude the use of the reflecting mirror, making the entire housing larger than the one shown in the present embodiment. In a version of the invention that uses a relatively short focal length lens, the lens and camera can be directly above the X-ray film thereby removing the need for the reflective mirror. The camera 32 is automatically turned on approximately one half second after the tray 6 has been fully slid into the housing 2 and the rear of tray 6 makes contact with microswitch 28. The preferred image array camera is made by Aptina LLC and is part number MT9P031112STM. Further description is 5 MP Mono CMOS 48LCC. Since this array is actually a color camera with a monochrome screen, each of the four quadrants of each pixel is usable data. So the array is actually able to capture twenty megabytes of data. In addition, Color does not interfere with the image detail since X-ray film itself is black and white. The preferred lens is made by Universe Kogaku America Inc. and is a seven MM F/4 CCD lens part number VL-7040N. However, it should be understood that other digital image array devices and lenses may be used and still be within the spirit of the present invention. It is important to note that the LED array has the novel feature of being dimmable by the user using a standard dimming circuit and a potentiometer so that he or she may select the ideal light level to create the ideal contrast, so that the user can get maximum benefit from the resulting image that shows up on his or her computer screen.

Figure 3:
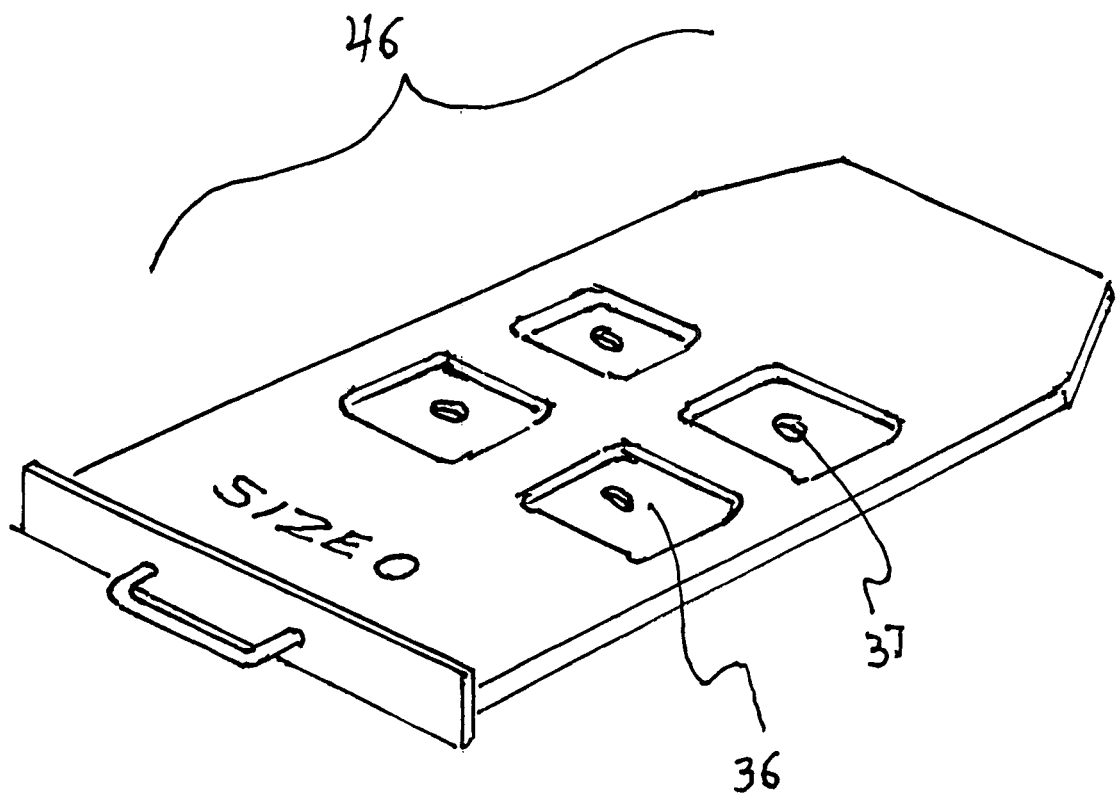
FIG. 3 is a perspective view of a film tray of the invention.

FIG. 3 shows a perspective view of the tray 46 of the present invention. In this particular case, the tray 46 has four depressions 36 to allow four standard size 0 film sheets to be inserted. Apertures 37 allow the user to push his or her finger up through the aperture to help push the film out of the recessed area 36.

Figure 4:
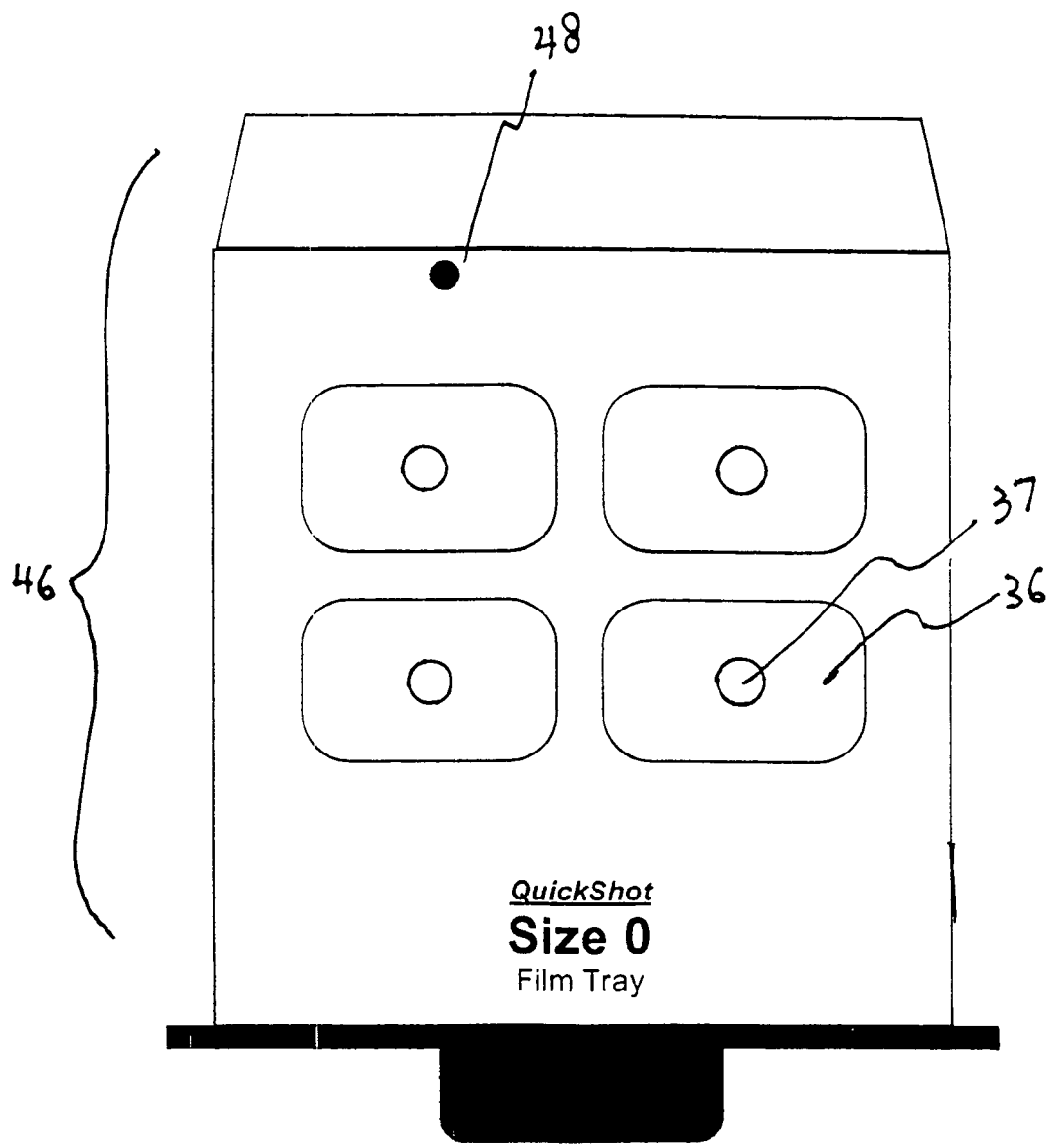
FIG. 4 is a plan view of a size 0 film tray.
Figure 5:
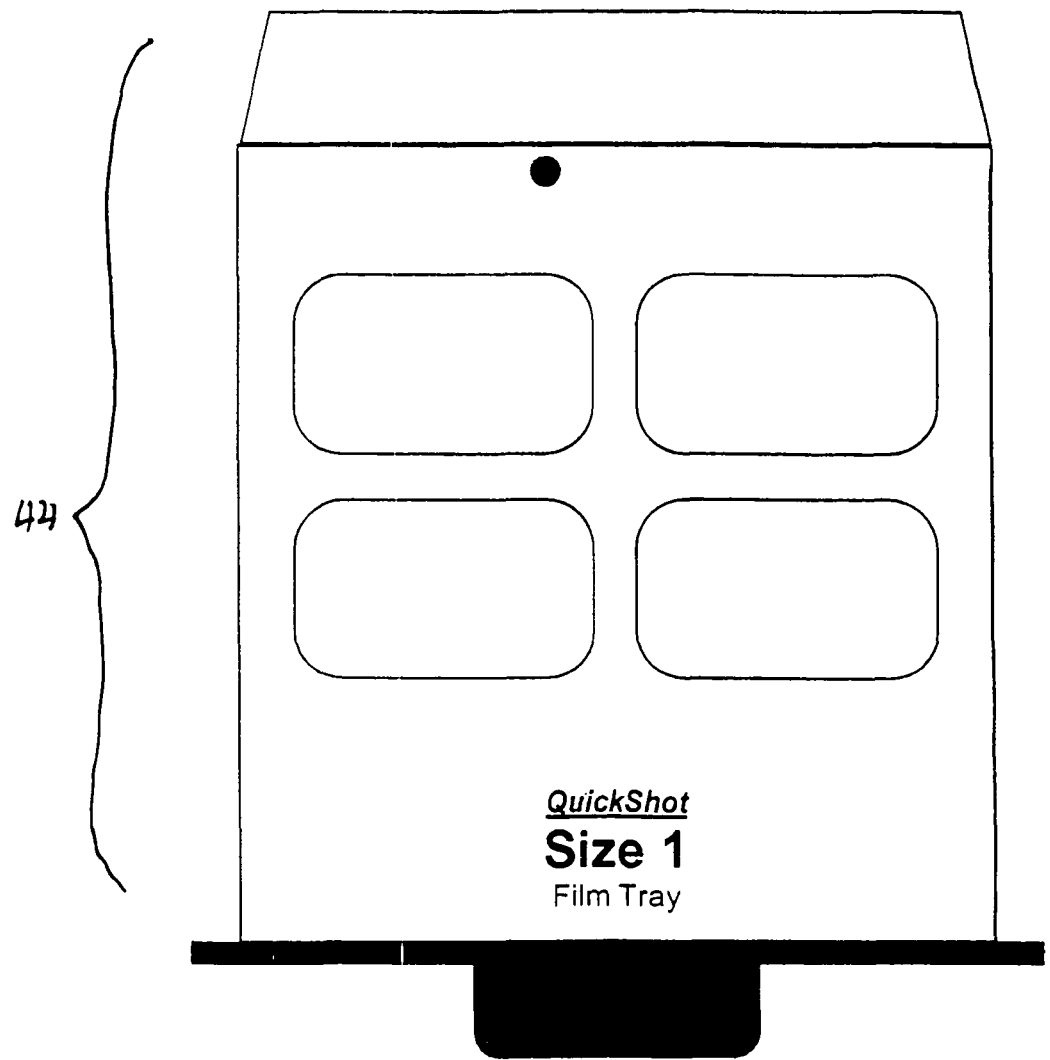
FIG. 5 is a plan view of a size 1 film tray.
Figure 6:
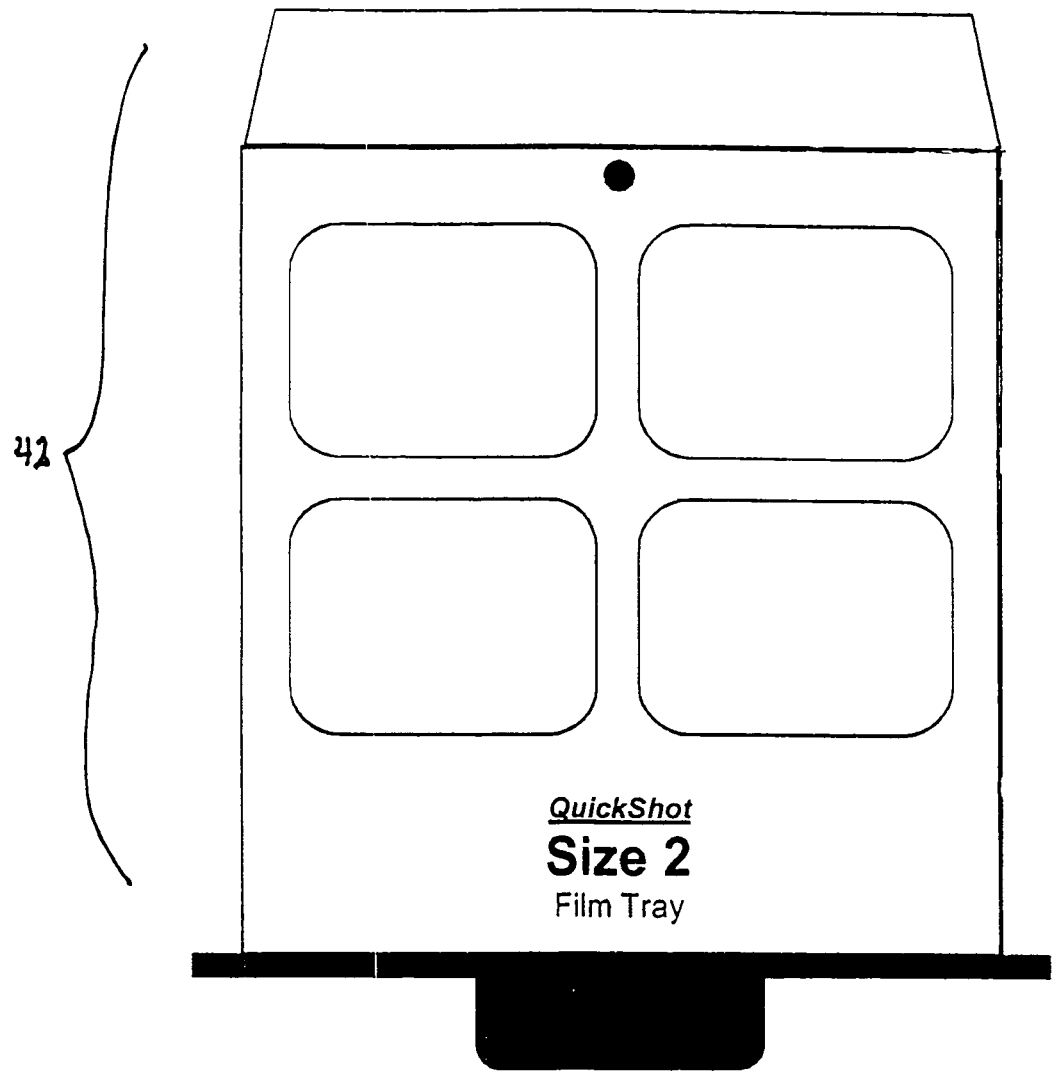
FIG. 6 is a plan view of a size 2 film tray.
Figure 7:
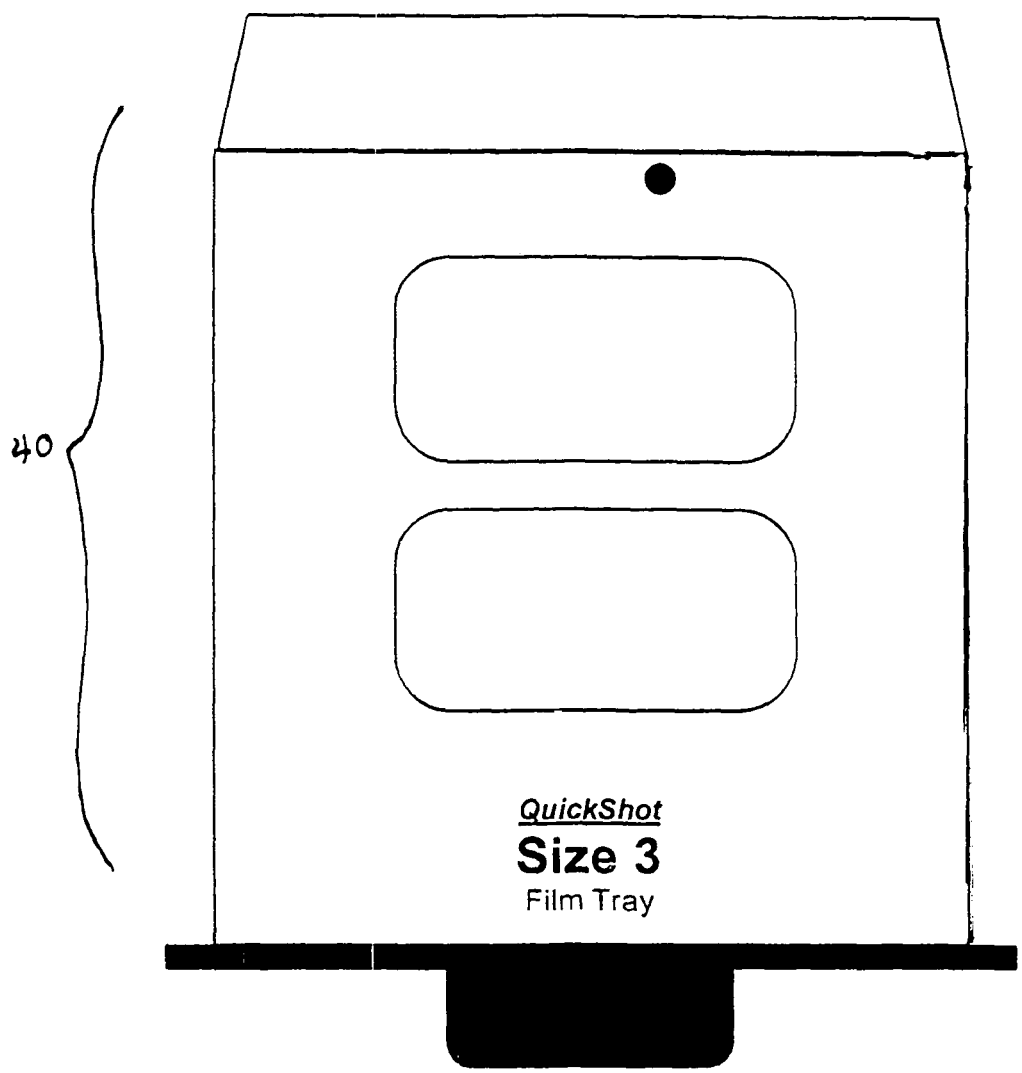
FIG. 7 is a plan view of a size 3 film tray.
Figure 8:
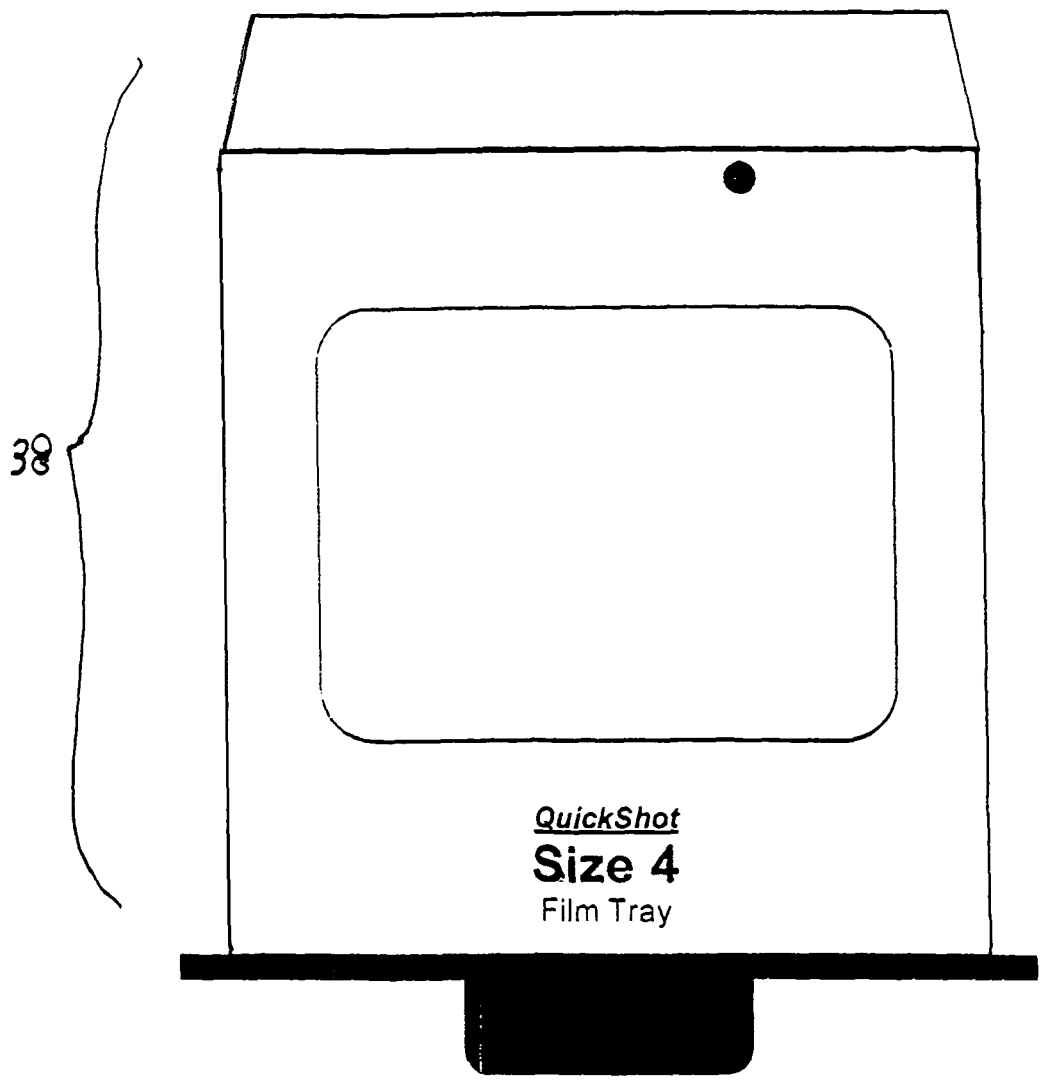
FIG. 8 is a plan view of a size 4 film tray.

There are a plurality of trays available, each having the same outer dimensions but each having different recess 36 configurations. FIG. 4 shows a plan view of the size 0 configuration 46. An indicator dot 48 is also captured by the image array camera 32. The location of this dot 48 tells the custom software in the receiving computer that it is looking at a size 0 film sheet. The location of the indicator dot 48 is different in a different location for each film size. FIG. 5 shows the tray configuration 44 for size 1 film. FIG. 6 shows the tray configuration 42 for size 2 film. FIG. 7 shows the configuration 40 for size 3 film. FIG. 8 shows the configuration 38 of size 4 film.

Figure 9:
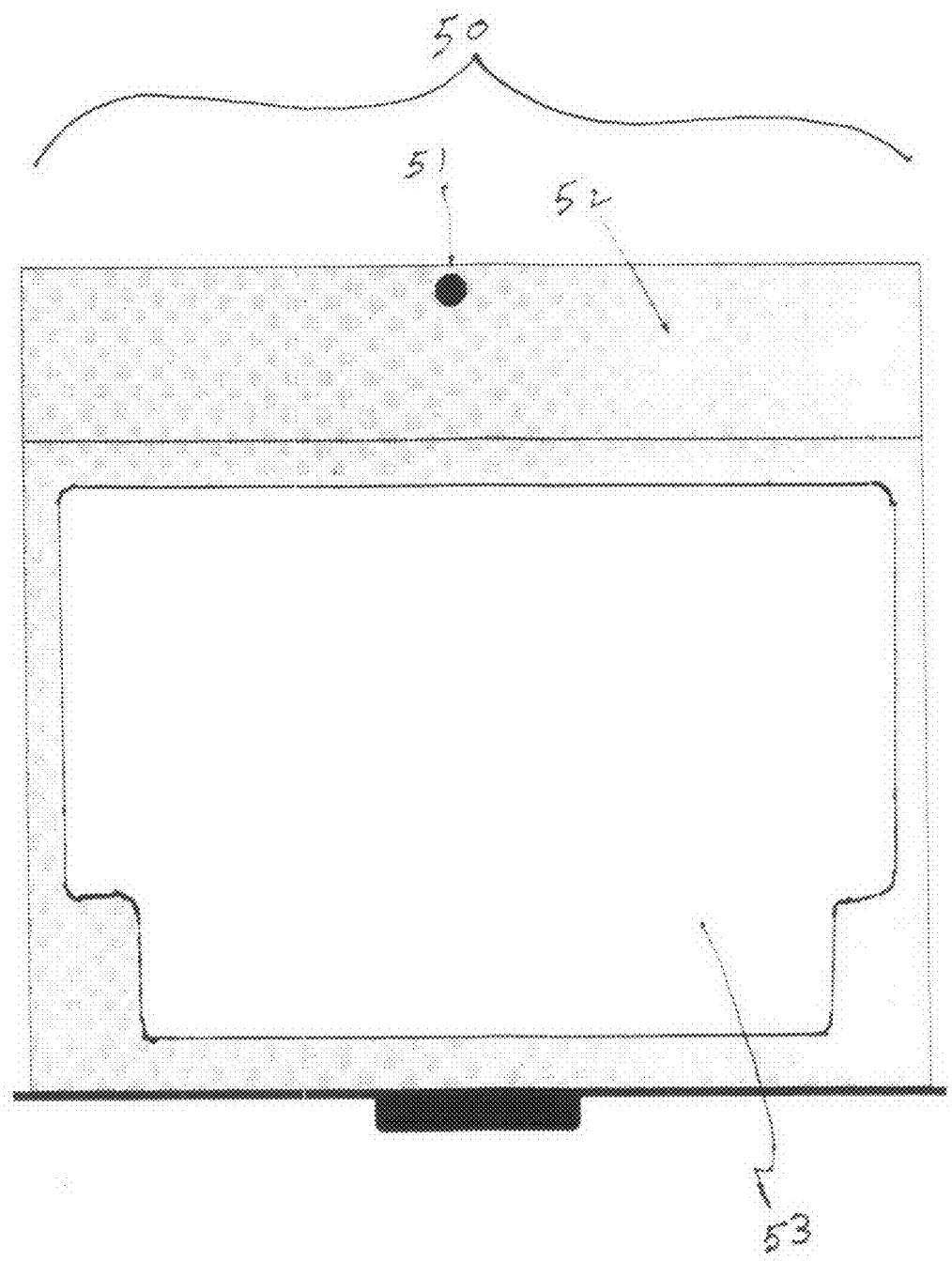
FIG. 9 is a plan view of a large format film tray.
Figure 10:
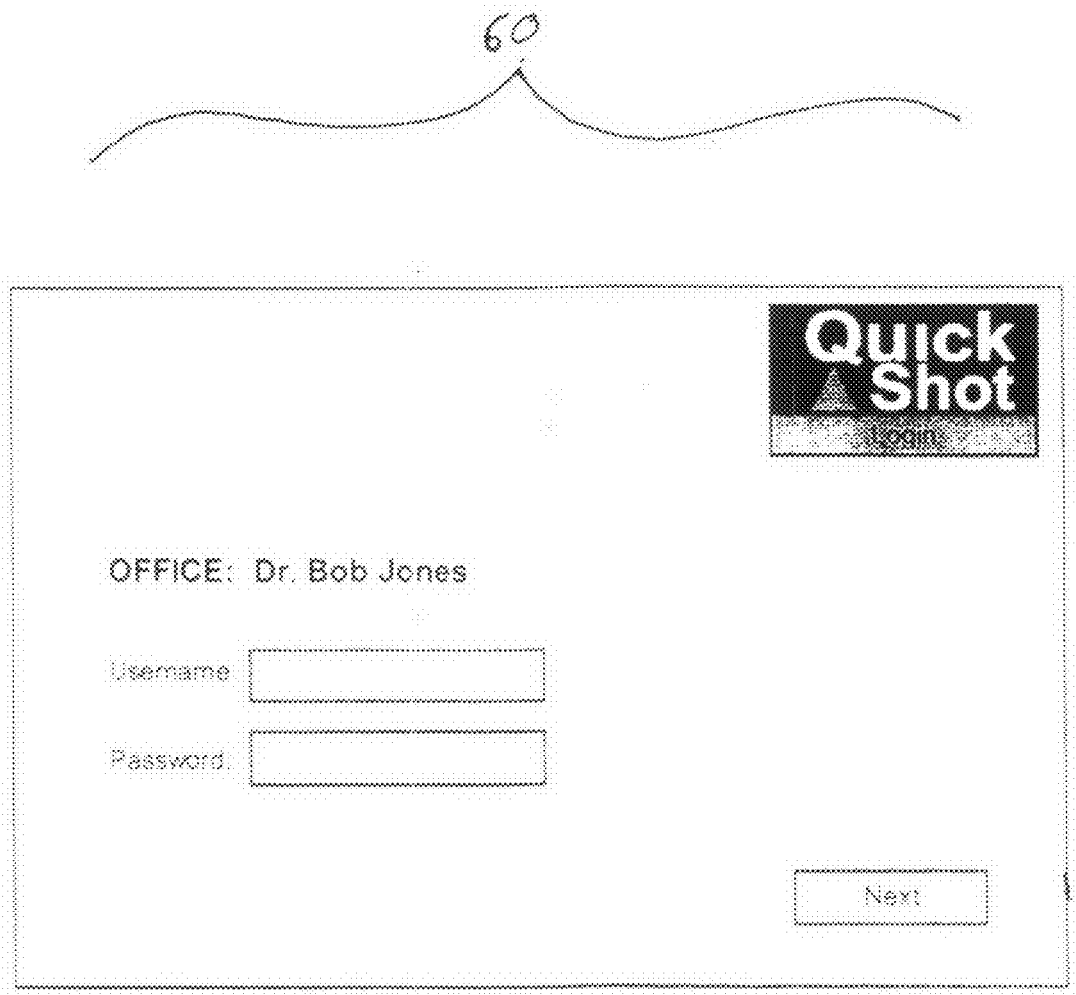
FIG. 10 is a screen image of a Doctor ID input graphic.

FIG. 9 shows a film tray 50 that is a larger version of original film tray 6. The overall housing and LED array is larger to accept the larger dimensions of this tray 50. This tray also includes a depressed area 53 within frame surface 52. Indicator dot 51 is used in a similar way as described above to tell the software what type of film is being viewed. This tray 50 accepts five inch X twelve inch film as well as six inch X twelve inch film and also eight inch X ten inch film.

Figure 11:
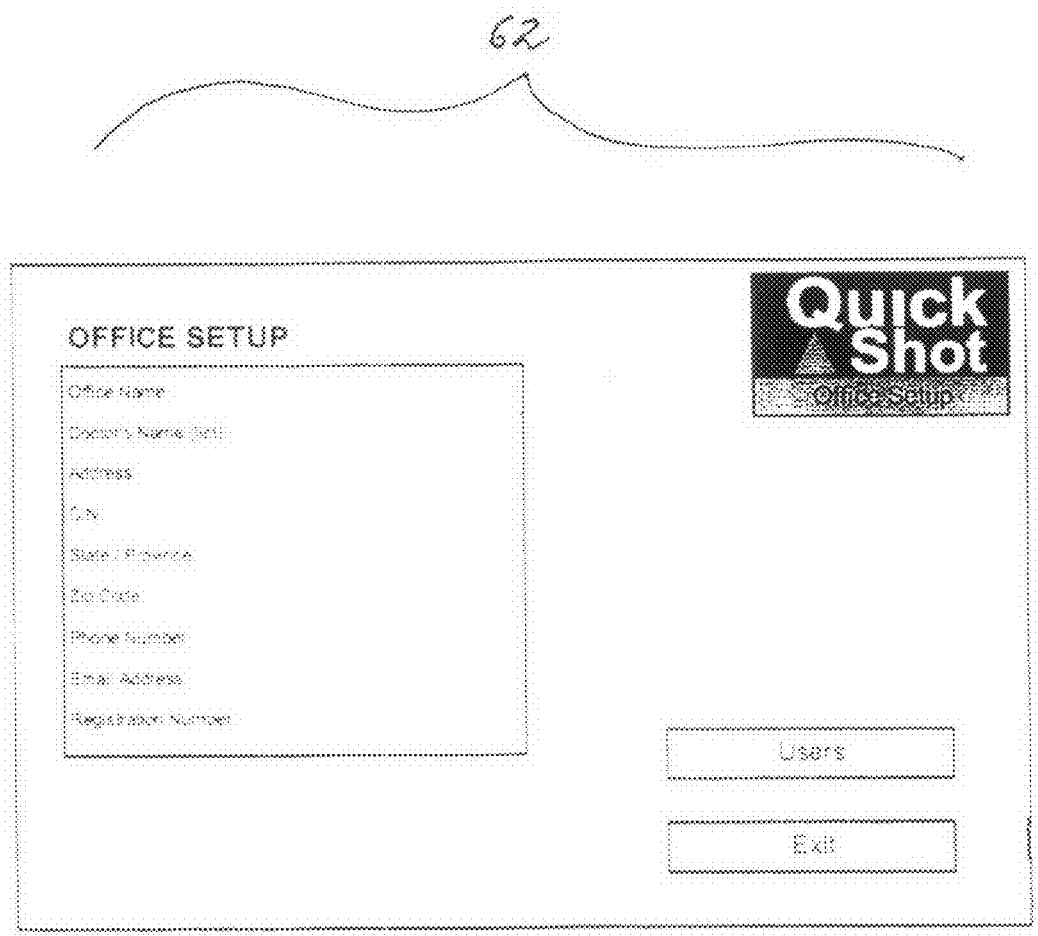
FIG. 11 is a screen image of an Office Information input graphic.
Figure 12:
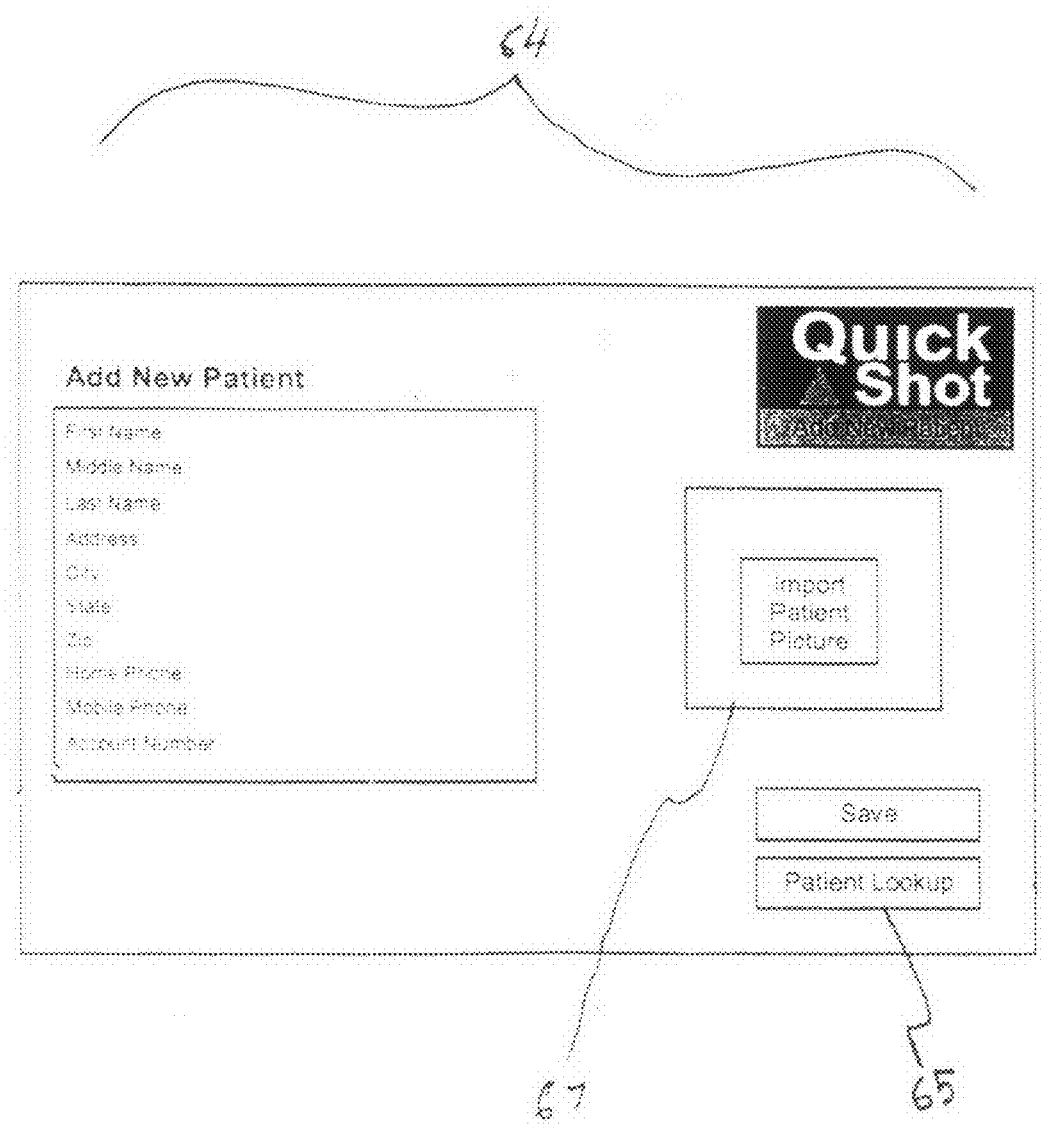
FIG. 12 is a screen image of a Patient Information input graphic.
Figure 13:
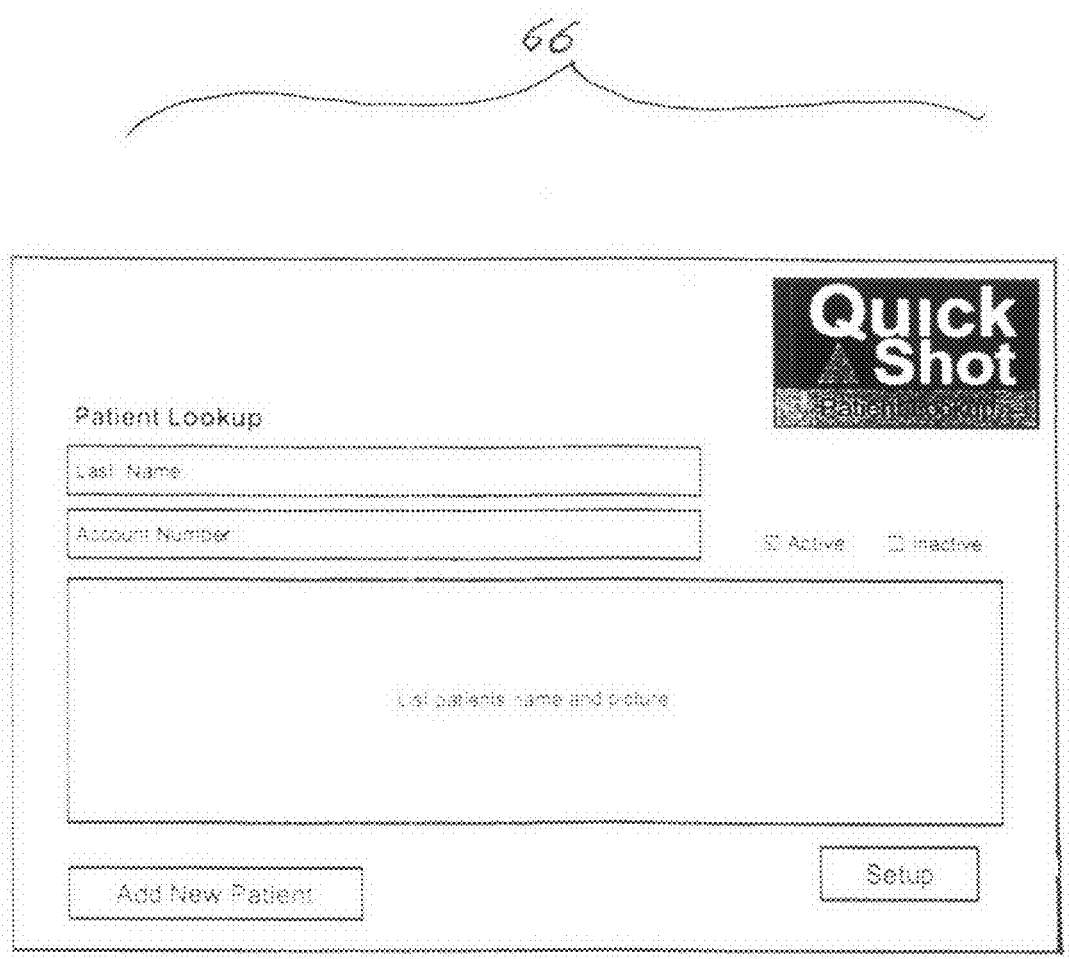
FIG. 13 is a screen image of a Patient Lookup graphic.

FIGS. 11 through 16 are computer screen capture images that help describe how the user interacts with the custom software that is installed in a standard computer to help receive, identify and manipulate the digital images of X-ray films that have been captured by the present invention. The screen shot 62 FIG. 11 shows the initial setup function where the user inputs all his or her information. FIG. 12 shows the screen shot 64 that allows the user to input all of the patient's information. A "patient lookup" button allows the user to find any patient in the system, and a photo of the patient 67 can be imported so that is will show up when the patient's name is entered. FIG. 12 shows a screen capture 66 that appears that shows the patient's information when the "patient lookup" button is pressed as shown in FIG. 12.

Figure 14:
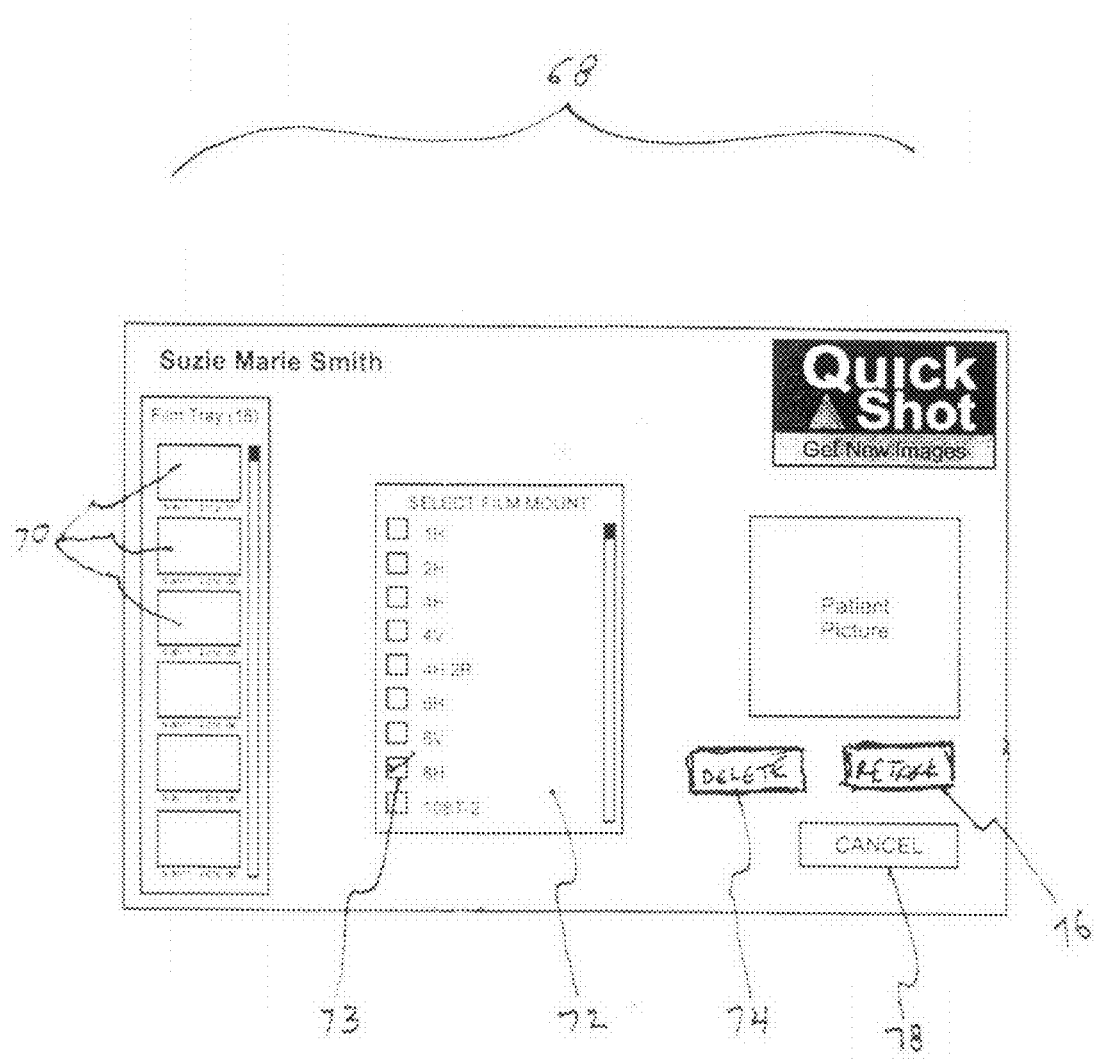
FIG. 14 is a screen image of an Image Capture Verification graphic.

When the user slides an X-ray film and tray 6 all the way into the housing 2, the image array camera 32 instantly records the image of the film and within one second the image shows up on the computer screen as shown by the view shown in FIG. 14 where the images on the film tray are displayed in a row 70 to the left of the screen. The film mount type is identified by a check mark in the appropriate box of the "select film mount" portion of the screen. If the user wishes to retake the image of the X-ray film, he or she can press the "delete" button and try again. Alternately, the user can press the "restore" button to bring the original image back. It is important to note that the original image will always remain within the memory of the software. In this way, even if the image is enlarged or otherwise manipulated, the original image is always available.

Figure 15:
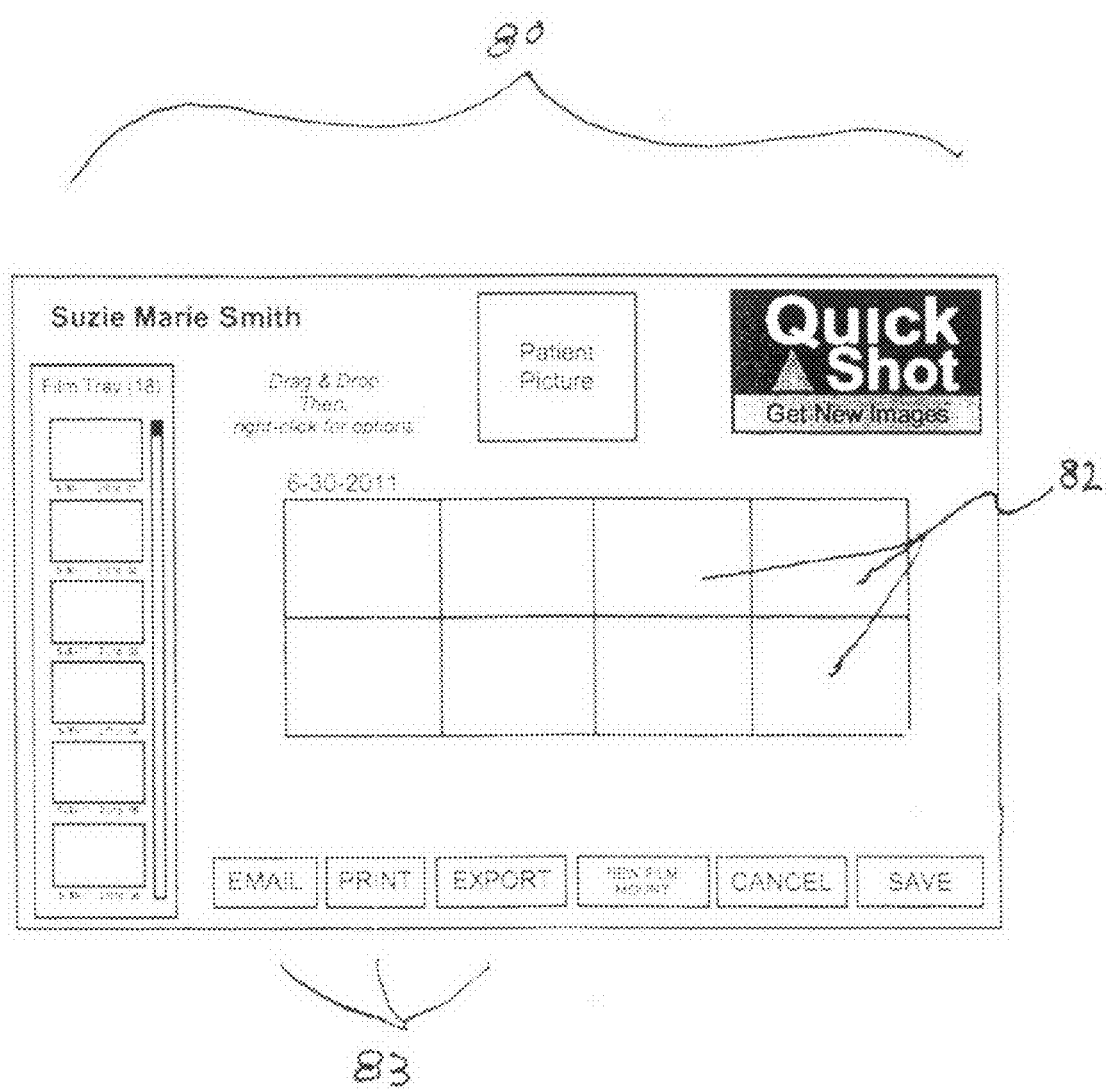
FIG. 15 is a screen image of an Image Sorting graphic.

FIG. 15 is a screen capture which shows the next level of inspection of the X-ray films where each film is enlarged 82 for better viewing. The set of films may be emailed, printed or exported by pressing the appropriate button 83 at the bottom of the screen 80.

FIG. 16 is a screen capture 84 which shows the ability to manipulate a single image of an X-ray. The image may be enlarged and specific areas of the image may be circled 86 by the user to identify areas of interest or concern. Notes about the image may be entered in the "note" box 88. The user may elect to change the color of the image by pressing one of the color selection keys 90. Additionally the user can adjust the contrast and brightness of the image by sliding adjustment icons 92. The resulting image can be emailed 94 or exported 96 as the user wishes.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A digital X ray capture device comprising:
   a hollow housing;
   a plurality of LED's;
   a film tray;
   an image array camera;
   an LED dimming control;
   a timing circuit;
   a micro-processor;
   a power supply;
   an on-off switch;
   a plurality of function indicating lights;
   custom computer software;
   said hollow housing being essentially rectangular in shape;
   said hollow housing including a front slot and inside ledges capable of removably inserting said film tray;
   said film tray being made of rigid transparent material;
   said LED's mounted in a uniform array to the inside bottom of said hollow housing and facing upward to evenly illuminate a sheet of film that is placed in said film tray;
   said image array camera affixed to the inside of said housing and in line with the image of said X ray film sheet;
   said image array camera capable of receiving and capturing an image of a standard photographic X ray film that is placed in said film tray and is illuminated by said LED array and said image directed into said camera;
   said micro-processor capable of receiving said image and sending it to an external standard computer device that is loaded with said custom computer software suitable for manipulating said image;
   all said internal electric components powered by said power supply;
   said power supply controlled by said on-off switch;
   said image receiving and capturing functions signaled as they occur by said function indicating lights and
   further including a mirror angled at forty-five degrees and mounted inside the upper front portion of said hollow rectangular housing;
   said mirror directing said X ray film image to said camera;
   said camera mounted in a horizontal orientation at the rear portion of said hollow rectangular housing.

2. A digital X ray capture device as claimed in claim 1 wherein said image receiving and capturing functions occur in approximately two seconds.

3. A digital X ray capture device as claimed in claim 1 wherein said captured images can be rotated, flipped, brightness controlled or colorized by said custom computer software.

4. A digital X ray capture device as claimed in claim 1 wherein said tray size is determined by the size of said standard X ray film sheet.

5. A digital X ray capture device as claimed in claim 1 wherein said array of LED's can be dimmed by a dimmer control circuit located within said hollow housing.

6. A digital X ray capture device as claimed in claim 1 wherein said captured image of X ray film includes, within it's boarder area, printed information about the patient being X rayed.

7. A digital X ray capture device as claimed in claim 1 wherein said image array camera is a twenty pixel monochrome image array.

8. A digital X ray capture device as claimed in claim 1 wherein said image array camera can zoom into portions of said X ray film and capture said portions without pixelation.

* * * * *